UNITED STATES PATENT OFFICE.

JESSE ASCOUGH, OF HANDSWORTH, ENGLAND.

PROCESS OF MAKING BORAX.

SPECIFICATION forming part of Letters Patent No. 476,592, dated June 7, 1892.

Application filed August 31, 1891. Serial No. 404,289. (Specimens.)

*To all whom it may concern:*

Be it known that I, JESSE ASCOUGH, agent, of Handsworth, in the county of Stafford, England, have invented certain new and useful Improvements in the Manufacture of Sodium Biborate or Borax and other Compounds Containing Boron; and I do hereby declare that the following is a full, clear, and exact description of the invention, which will enable others skilled in the art to which it appertains to make and use the same.

This invention consists in the production of boron compounds by mixing their component parts or taking solutions containing such parts and treating them in such manner that chemical combination will promptly result and granular borax be at once produced.

To illustrate my process in the production of sodium biborate or borax by mixing the component parts, I take crystal sodium carbonate, seventy-one pounds, represented by the equation $Na_2CO_3 10H_2O$, and boric or boracic acid, sixty-two pounds, represented by the formula $H_3BO_3$, and I place these ingredients in any suitable place or vessel where heat can be applied to assist their solution, and, if needful, I add during the process a small quantity of water in the shape of steam or otherwise just sufficient to thoroughly complete the solution and thus hasten the natural affinities they possess to chemically combine with each other. I then make use of heat to drive off superfluous moisture until the solution is reduced to a semi-liquid, fused, or plastic condition, represented by the formula $Na_2B_4O_7 10H_2O$. I then transfer the mass (by preference) into shallow vessels, where I can by agitation hasten the cooling process, and thus facilitate the formation of granular borax. In this process, however, I distinctly avoid using any more water than is absolutely necessary for effecting complete chemical solution, and on this result being obtained I drive off and at once all surplus moisture, so that granular borax can be produced in a few hours.

To illustrate my process in the production of sodium biborate or borax by taking a solution containing the component parts, I follow any of the usual processes for manufacturing ordinary borax in large crystals up to the point where the constituents are held in solution by excess of water. I then deviate entirely from the old method and (instead of setting the solution aside for large crystals to be gradually formed, a process occupying several days or weeks) I proceed at once to get rid of all excess of water by the quickest methods possible, preferably by those already named, so that borax in a granular state, as already described, may be quickly produced. I can also manufacture sodium borate, potassium borate, or other boron compound by taking the equivalent or approximate component parts of such compound and proceeding as already described for production of sodium biborate or borax.

I wish it to be understood that I do not bind myself strictly to the exact details here given; but I distinctly state that I avoid the use of large quantities of water, the consequent production of mother-liquors, and the waste of time inseparable from the process of making large-crystal borax, while I require less apparatus and I produce granular borax in a very short time. By my method of manufacture I also produce borax which is of greater purity than that produced by methods heretofore followed.

Another advantage of my invention is that the small crystals are ready for immediate use, whereas over ninety per cent. of the large crystals produced by methods heretofore practiced require to be broken up or crushed for use, and as those large crystals are very hard the crushing or breaking is very expensive, and to obviate this is a desideratum in the manufacture of borax.

Having fully described my invention, what I desire to claim and secure by Letters Patent is—

The herein-described method of manufacturing granular sodium biborate or borax, which consists in placing the component parts in a suitable vessel, adding thereto a small quantity of water, subjecting the same to heat to drive off the superfluous moisture, transferring the mass to other vessels, and agitating the same during process of cooling, substantially as described.

JESSE ASCOUGH.

Witnesses:
 FREDERICK W. ARCHER,
 W. BERNARD CURRALL.